United States Patent [19]
Eilers et al.

[11] 3,795,276
[45] Mar. 5, 1974

[54] COMPOSITION AND THE USE THEREOF FOR REDUCING THE PERMEABILITY OF A FORMATION

[75] Inventors: Louis H. Eilers, Inola; Christ F. Parks, Tulsa, both of Okla.

[73] Assignee: The Dow Chemical Company, Midland, Mich.

[22] Filed: Oct. 20, 1971

[21] Appl. No.: 191,059

[52] U.S. Cl. ............................ 166/295, 166/294
[51] Int. Cl. ............................................ E21b 33/13
[58] Field of Search .... 61/36 R; 166/270, 293, 294, 166/295; 252/316

[56] References Cited
UNITED STATES PATENTS

| | | | |
|---|---|---|---|
| 3,730,272 | 5/1973 | Richardson et al. | 166/294 |
| 3,732,927 | 5/1973 | Richardson | 166/294 |
| 3,611,733 | 10/1971 | Eilers and Parks | 166/294 |
| 3,375,872 | 4/1968 | McLaughlin et al. | 61/36 R |
| 3,437,625 | 4/1969 | Bonnel et al. | 166/295 |
| 3,614,985 | 10/1971 | Richardson | 166/294 |
| 3,654,993 | 4/1972 | Smith et al. | 166/279 |

*Primary Examiner*—Marvin A. Champion
*Assistant Examiner*—Jack E. Ebel
*Attorney, Agent, or Firm*—Bruce M. Kanuch

[57] ABSTRACT

An aqueous solution of a water-soluble polymer which can be cross-linked in the presence of certain ions by adjusting the pH of the solution is disclosed. The aqueous solution contains a cross-linkable water-soluble organic polymer and at least two cross-linking agents (ions) for said polymer, each cross-linking agent (ion) being effective to cross-link the polymer at a different pH value. The pH of the initial solution is adjusted to a value between the two effective pH values where minimal (if any) cross-linking occurs. The pH can be adjusted up or down to within a range which is effective to cross-link the polymer.

11 Claims, No Drawings

3,795,276

COMPOSITION AND THE USE THEREOF FOR REDUCING THE PERMEABILITY OF A FORMATION

BACKGROUND OF THE INVENTION

It is often desirous to reduce the permeability of a subterranean formation to the flow of certain fluids. For example, it may be desired to modify water injection well profiles such as generally described in the U.S. Pat. No. 3,455,393. Also, it may be desired to treat a hydro-carbon fluid bearing formation to reduce water production therefrom such as, for example, disclosed in U.S. Pat. Nos. 3,308,885 and 3,087,543. Also, it may be desirous to completely seal a permeable formation either temporarily or for a substantial period of time to prevent the flow of any fluid therethrough.

Many gels, hydraulic cement slurries, sodium silicate slurries and other diverting and plugging agents have been employed in the past to plug such formations. However, many difficulties have been incurred because of the nature of the environment which is to be treated. For example, some environments may be acidic in nature because of prior treatment with acids, the oxidation of sulfide ores, or the like, while others may be basic in nature because of natural occurring minerals such as limestone, etc.

The present invention concerns an aqueous solution of a water-soluble organic polymer which may be gelled in environments ranging from acidic to basic and a method of treating permeable formations with such solutions.

SUMMARY OF THE INVENTION

The composition of the present invention comprises an aqueous solution of a cross-linkable water-soluble organic polymer and at least two cross-linking agents, for said polymer. One cross-linking agent is effective to cross-link the polymer when the pH value of the solution is lowered while the other cross-linking agent is effective to cross-link the polymer when the pH value of the solution is raised. The pH of the initial composition is a value between the effective cross-linking values.

To reduce the permeability of a formation, an aqueous solution of the polymer and cross-linking agents is injected into the formation and the pH thereof is adjusted to a value which is effective to cross-link the cross-linkable water-soluble organic polymer, i.e., it is adjusted to within one of the effective pH ranges.

DETAILED DESCRIPTION OF THE INVENTION

Any cross-linkable water-soluble polymer which can be dispersed in an aqueous solution and which may be cross-linked in an aqueous solution to form a gel by the use of an effective cross-linking ion and pH adjustment can be employed in the practice of the present invention.

The term "water-soluble organic polymer" refers to organic materials composed of a number of repeating units. The useful polymers are characterized by dispersibility in water to form visually continuous solutions or dispersions which may be cross-linked through the use of an effective cross-linking agent and pH adjustment. The water-soluble organic polymers useful herein are available in a wide variety of chemical compositions. They may be obtained as natural polymeric products; by modification of natural polymeric products or by synthesis of polymerizable materials. The polymers are characterized as having anionic, cationic, or both, cross-linking sites in or along the backbone thereof. Preferred are polymers containing a plurality of functional groups which disassociate in water to form an anionic site. Such functional groups include, for example, carboxylic, hydroxyl, sulfonate, amine and the like. Specific polymers which may be employed include acrylamide polymers, polymers and copolymers formed with a polymerizable monomer, said acrylamide polymer being at least partially hydrolyzed or otherwise containing an anionic functional group in or along the backbone thereof. Other polymers which may be employed include various sulfonated polymeric organic materials such as sulfonated polyvinyl toluene, sulfonated polystyrene, copolymers of maleic acid or partially hydrolyzed maleic anhydride, carboxymethyl cellulose, polyvinyl pyrrolidinone, anionic starches and the like.

As an example of one cross-linking agent of the present invention a multivalent inorganic cation which forms a hydroxide precipitate from a 0.02 solution of said salt when the pH of said solution is adjusted to within a value of about 4 or higher, preferably between about 7 to about 4, can be employed. Such multivalent cations include, for example, neodynium, zinc, cobalt, scandium, nickel, lead, beryllium, iron $^{+2}$, copper, chromium $^{+3}$, $VO^{+2}$, $VO_2^{+2}$ and aluminum. These multivalent inorganic cations may be introduced into the aqueous solution as a water-soluble salt. These salts may be, for example, sulfates, nitrates, chlorides or the like. The only requirement of the salt is that the corresponding anion be compatible with the aqueous solution and organic polymer present therein. The cross-linking produced by these cations is generally reversible, i.e., the polymer is cross-linked by raising the pH of the solution, and cross-linking is broken by lowering the pH value of the solution.

The second crss-linking agent can comprise an organic cross-linking compound consisting of a low molecular weight water soluble aldehyde or water soluble derivative thereof which will cross-link the water soluble anionic organic polymer at a pH of about 3 or lower. Generally, the more acid the pH, the more rapid the cross-linking. Specific organic cross-linking agents include, for example, formaldehyde, paraformaldehyde, glyoxal, and compounds, such as hexamethylenetetramine, which can produce formaldehyde or glyoxal in an acidic solution, and the like. The cross-linking produced by these organic compounds is generally of a permanent nature.

The concentration of the water-soluble organic polymer in the aqueous solution is dependent on the desired physical characteristics of the gel and initial solution. In some instances initial viscosities of less than about 20 are desirable, for example, when used for treating injection and producing wells. In other applications higher initial viscosities may be desired. The viscosity of an aqueous solution is dependent on the specific organic polymer employed, the molecular weight of the polymer employed, pH, temperature, quantity of polymer and other known criteria. The viscosity of the solution can be adjusted by one skilled in the art to meet a desired need.

The amount of cross-linking agent employed may be varied over a wide range. It is known that as the amount of cross-linking of a polymer is increased the more rigid and less soluble is the gel formed. Actually, in practice, the amount of cross-linking agent can be varied from about 0.01 percent to about 50 percent based on the weight of the polymer present in the aqueous solution. The amount of the cross-linking agent employed depends largely on the type of polymer present and the firmness of the resulting gelled material that is desired. However, excess cross-linking can produce a water-insoluble precipitate. It is desired that the amount of cross-linking agent employed be sufficient to provide between about 1 and about 20 cross-links per polymer molecule.

When employing the cross-linking agents as defined herein the pH of the original or initial aqueous solution is adjusted to a value which is between the effective cross-linking values of both cross-linking agents. For example, the table shown in *Inorganic Chemistry*, 5th Ed., by Fritz Ephraim, page 463, sets forth the pH values at which certain inorganic polyvalent cations will form a hydroxide precipitate in an aqueous solution. Therefore, as an example if chromium and glyoxal are employed as the duel cross-linking agents chromium will cross-link the polymer at approximately a value of 5.3 pH or above, while glyoxal will cross-link the polymer at a pH of about 3 or below. Thus, the original pH of the solution is adjusted between the value of about 5 and about 3.5. Preferably the initial pH value of the solution is adjusted to a value which is about halfway between the two effective pH values. In the above example, chromium and glyoxal, the initial pH value of about 4.5 is preferred. It is preferred that the effective cross-linking pH values of the two cross-linking agents differ by at least about 2.

To plug a permeable formation (for example to modify a water injection profile) the initial aqueous solution of the organic polymer and cross-linking agents having a pH adjusted so that the organic polymer is not cross-linked or at the most very slowly cross-linked, is injected into the permeable formation. After being injected the pH of the solution is adjusted to within one of the effective cross-linking pH values. This adjustment may occur because of the natural environment conditions into which the aqueous solution is injected. For example, in limestone formations the pH of the generally acidic initial aqueous solution is raised to a value which will permit cross-linking of the gel. In acidic environments, i.e., containing acids, acidizing fluids or the like, the pH value is lowered and the second cross-linking agent will become effective to cross-link the gel.

The following examples will facilitate a more complete understanding of the present invention.

EXAMPLE 1

0.5 Percent by weight of a 32 percent by weight (0.16 percent active) solution of sodium polystyrene sulfonate, having a molecular weight of between about 1,000,000 and about 2,000,000 was prepared by polymerizing sulfonated styrene according to Volk, U.S. Pat. No. 3,206,445.

The pH of the so prepared solution was then adjusted to a value of 2 by the addition of hydrochloric acid. Aluminum sulfate hydrate, i.e., $Al_2(SO_4)_3 \cdot 18H_2O$ (cross-linking agent), was admixed therewith to provide a concentration therein of 0.1 percent by weight of the hydrate. The composition so prepared was then pumped into a 10 foot length section of a 2 inch diameter steel pipe. There was thereafter emplaced therein a mass of 20 to 40 mesh size $CaCO_3$ particles intermixed with 20 to 40 mesh size sand in a ratio of 10 $CaCO_3$ to 90 sand. The permeability of the mixture was ascertained to be 72 darcys at 50 psi pressure.

2,000 Milliliters of the polymer composition above prepared were then pumped into one end of the pipe section containing the calcium carbonate-sand mixture at a controlled rate of about 1 foot penetration per minute at a slowly increasing pressure up to 500 psi. There was a penetration into the particulate mixture to a distance of 7 feet. The permeability was then measured and found to be zero at 500 psi and a mere 0.34 darcy at 1000 psi. This shows that the cross-linking ability of the $Al^{+3}$ was initiated by raising the pH of acidic solution because of the basic $CaCO_3$ material.

EXAMPLE 2

Tests similar to that performed in Example 1 were conducted but instead of the polymerized sulfonated styrene employed in Example 1 the polymer here employed consisted of 0.4 percent by weight of polyacrylamide prepared according to known practice. The polyacrylamide had an average molecular weight of between about 2,000,000 and about 3,000,000 and between about 4 percent and 7 percent thereof was hydrolyzed. The cross-linking agent employed was aluminum sulfate hydrate and was employed in the amount of 0.08 percent. The polymers were added as an aqueous solution which was pumped into a 5 percent calcium carbonate and 95 percent sand mixture in the 10 foot, 2 inch diameter pipe in accordance with the procedure followed in Example 1. Penetration was the complete 10 feet into the particular mixture. The permeability through the first 5 feet of the resulting mixture was then measured and found to be zero at 400 psi; and 0.04 darcy at 450 psi. The permeability of the back 5 feet was then measured and found to be 0.09 darcy at 200 psi.

The front 5 foot pipe section of Example 2 was further tested to show the permanence of the gel to neutral pH water and the temporary character to acid pH water. Water at a pH of about 7.4 was continuously forced through this section for a period of 2 months. The permeability at the beginning of the test was 0.04 darcy. This increased to 0.075 darcy after one week and to 0.13 darcy after about two months flow. Five liters of 5 percent hydrochloric acid were then pumped into one end of the pipe section at a rate of about 1 foot penetration per minute. The acid contained 0.2 percent of an organic inhibitor (U.S. Pat. No. 3,077,454) to protect metal parts of the equipment. After 10 minutes the permeability of the composition had increased to 12.6 darcys and in 20 minutes (5 liters of the acid solution) the permeability had increased to 17.3 darcys.

This compared to a permeability of 0.13 darcy at the beginning of the acid treatment and a permeability of 68 darcy for the untreated sand-$CaCO_3$ emplaced in the pipe. This shows the ability of low pH solutions to effectively remove the sealing properties of the composition of the invention when cross-linked at a neutral pH.

EXAMPLE 3

Tests similar to that performed in Example 1 were conducted employing 0.12 percent by weight of polyacrylamide prepared according to known practice. The polyacrylamide had an average molecular weight of between about 1,000,000 and about 2,000,000 and between about 4 percent and 7 percent thereof was hydrolyzed. The cross-linking agent employed was 0.023 percent formaldehyde (0.6 percent of 38 percent formaline). The polymers were pumped as an aqueous solution into a similar 10 foot length of 2 inch steel pipe. Emplaced in this pipe was a 5 foot section of 20 to 40 mesh size sand and a second 5 foot section of 20 to 40 mesh sand intermixed with 5 percent, 20 to 40 mesh size $CaCO_3$ particles. The permeability of the combination was ascertained to be 68 darcys. Penetration was observed for the full 10 feet without gelation. Thereafter the pipe section was closed in at 500 psi fluid pressure for 24 hours to allow gelation. The permeability of the front 5 feet (sand section) was then measured and found to be 0 at 1,000 psi and 0.01 darcy at 3,600 psi. The permeability of the second 5 feet (sand containing 5 percent $CaCO_3$) was found to be 0 at 500 psi and 0.04 darcy at 1,000 psi.

EXAMPLE 4

This test was performed in a hole, approximately 6.5 inches in diameter and 23 feet deep, which had been drilled into permeable sandstone. The hole was provided with a 2 inch tubing. Preliminary tests showed that the sandstone had accepted water at a rate of about 7.7 gallons per hour. 10 Gallons of a composition which comprised a 0.5 percent by weight solution of (1) polyacrylamide of a molecular weight of between about 2,000,000 and 3,000,000; hydrolyzed to between about 25 percent and 35 percent (carboxamide groups converted to carboxylic groups), and 2 percent by weight HCl and 0.3 percent by weight $FeCl_3$.

The solution so prepared was circulated down the tubing and up the annulus of the hole in the sandstone formation for 10 minutes. Thereafter, water was injected down the hole and the rate at which the formation accepted water was measured.

It was found 1.1 gallons of water were accepted into the sandstone formation during the first hour; the rate of acceptance dropped to 0.5 gallons during the second hour; and thereafter the rate of acceptance of water continued to drop gradually over the period of three days at the end of which it was measured and found to be less than 0.1 gallon per hour.

EXAMPLE 5

This test was performed in a well in central Oklahoma. The well was cased to a total depth of approximately 11,200 feet. A packer was set a approximately 10,900 feet with 2 7/8 inch tubing to surface. The well was perforated at various intervals between about 11,000 and 11,200 feet. This well was a water (low density brine) injection well in a waterflood project to recover additional oil from this field. The lower ten feet of perforations were receiving 84.5 percent of the injected water and the remaining 190 feet only 15.5 percent.

This well was treated with an aqueous solution of acrylamide polymer having an average molecular weight of about 1,500,000 and about 1 percent thereof being hydrolyzed, containing two cross-linking agents, an acid to adjust pH, and a cross-linking accelerator. The treatment solution comprised 1400 barrels of formation brine containing 1200 pounds of said polymer, 120 pounds of as one cross-linking agent formaldehyde, 120 pounds of aluminum sulfate hydrate to supply $Al^{+3}$ as the second cross-linking agent, 12 pounds of aniline accelerator, and 350 pounds of sulfamic acid used to adjust the pH of the brine to between 3.0 and 3.2. Over a period of 22 hours this solution was injected into the formation through the perforations. Following this nontreated brine was then injected to continue the waterflood. Ten days later it was found that 52.3 percent of the brine was entering the bottom 10 feet and 47.7 percent the upper 190 feet. This was an increase of over 200 percent in water entering the desired upper portion of the waterflood zone.

What is claimed is:

1. In the method of reducing the permeability of a formation consisting of the steps of injecting an effective quantity of an aqueous solution of a cross-linking water-soluble organic polymer into the formation and cross-linking the polymer to effectively plug the formation, the improvement which comprises:
   a. injecting an aqueous solution of a cross-linking water-soluble organic polymer containing at least two cross-linking agents for said polymer, one of said cross-linking agents being effective to cross-link said polymer at a low pH value and the other being effective to cross-link the polymer at a higher pH value, said aqueous solution having an initial pH equal to a value between said effective cross-linking pH values, and
   b. adjusting the initial pH of said solution after it is injected to a value which is effective to cross-link said water soluble organic polymer.

2. The method of claim 1 wherein one cross-linking agent is effective to cross-link said polymer at a pH of 3 or below and the other is effective to cross-link the polymer at a pH of 4 or above.

3. The method of claim 1 wherein one of said cross-linking agents consists of at least one multivalent inorganic cation which forms a hydroxide precipitate from a 0.02 molar solution of said cation when the pH of said solution is adjusted to a value of between about 7 and about 4, and the second cross-linking agent consists of at least one organic compound which is effective to cross-link the water-soluble polymer at a pH of about 3 or lower, said pH of said solution being between the effective pH values of said cross-linking agents.

4. The method of claim 3 wherein the inorganic multivalent cation consists of at least one of Nd, Zn, Co, Cd, Ni, Yb, Pb, Be, $Fe^{+2}$, Cu, $Cr^{+3}$, $VO^{+2}$, $VO_2^{+2}$, or Al, and the organic cross-linking agent consists of a low molecular weight water-soluble aldehyde, or a water-soluble derivative thereof which is effective to cross-link said organic polymer in an aqueous solution having a pH of about 3 or lower.

5. The method as defined in claim 3 wherein the inorganic multivalent cation is aluminum or chromium and the organic compound is formaldehyde, paraformaldehyde or glyoxal.

6. The method of claim 3 wherein the cross-linkable water-soluble polymer is an anionic acrylamide polymer.

7. In the method of modifying water injection well profile and decreasing the water/oil ratio in the total well effluent from a production well consisting of injecting into the formation in the injection well or producing well a substantial quantity of an aqueous solution of a cross-linkable water-soluble anionic organic polymer the improvement which comprises:

a. including in said aqueous solution of said polymer at least one dissolved polyvalent metal cation characterized as forming a metal hydroxide precipitate from a 0.02 molar solution of said cation when the pH is adjusted to a value between about 7 and 4 and at least one organic compound which is effective to cross-link the polymer at a pH of 3 or lower,
b. providing a pH value in said aqueous solution of said polymer between the effective cross-linking pH value of said cross-linking agents, and
c. adjusting the pH value of said aqueous solution after it has been injected into said formation to a value which is effective to cross-link said polymer.

8. The method of claim 1 wherein the effective pH values differ by a numerical value of at least about 2.

9. The method of claim 2 wherein the effective pH values differ by a numerical value of at least about 2.

10. The method of claim 4 wherein said cross-linking agents have effective pH values differing by at least about 2.

11. The method of claim 7 wherein the cross-linking agents have effective cross-linking pH values differing by a numerical value of at least about 2.

* * * * *